United States Patent [19]  
Saeki et al.

[11] 3,956,172  
[45] May 11, 1976

[54] PROCESS FOR HARDENING MICROCAPSULES CONTAINING HYDROPHOBIC OIL DROPLETS

[75] Inventors: Keiso Saeki; Hiroharu Matsukawa, both of Fujinomiya, Japan

[73] Assignee: Fuji Photo Film Co., Ltd., Minami-ashigara, Japan

[22] Filed: July 18, 1973

[21] Appl. No.: 380,441

[30] Foreign Application Priority Data  
July 19, 1972 Japan................................ 47-72227  
Aug. 7, 1972 Japan................................ 47-78873

[52] U.S. Cl..................................... 252/316; 424/34; 424/37; 427/150; 427/151; 427/338; 428/307
[51] Int. Cl.²......................................... B01J 13/02
[58] Field of Search................. 252/316; 117/100 A, 117/62.2; 424/34, 37; 427/338

[56] References Cited  
UNITED STATES PATENTS  
3,043,782 7/1962 Jensen ............................... 252/316  
3,687,865 8/1972 Katayama et al................... 252/316

*Primary Examiner*—Richard D. Lovering  
*Attorney, Agent, or Firm*—Sughrue, Rothwell, Mion, Zinn & Macpeak

[57] ABSTRACT

In a process for hardening microcapsules produced by microencapsulating hydrophobic oil droplets using a complex coacervation process with gelatin as one of the hydrophilic colloids: including the steps of
1. emulsifying a water-immiscible oil in an aqueous solution of at least one first hydrophilic colloid ionizable in water and admixing an aqueous solution of at least one second hydrophilic colloid having an electric charge opposite to that of said first colloid,
2. causing coacervation of said colloids to occur by adding water thereto or adjusting the pH thereof to form coacervates,
3. cooling said coacervates to cause gelling thereof,
4. adjusting the pH to alkalinity and adding a hardening agent sequentially or simultaneously,
5. increasing the temperature so as to cause hardening, the improvement wherein glyoxal or glutaraldehyde in combination with formaldehyde is present during step (4).

6 Claims, No Drawings

PROCESS FOR HARDENING MICROCAPSULES CONTAINING HYDROPHOBIC OIL DROPLETS

BACKGROUND OF THE INVENTION

1. Field of the Invention

The present invention relates to an improved process for hardening microcapsules containing hydrophobic oil droplets, the microcapsules comprising a coacervate wall film of hydrophilic colloids. More particularly, in the production of microcapsules by a process of complex coacervation using at least gelatin as one hydrophilic colloid and a dialdehyde as a hardening agent, it relates to a process for hardening to thereby prevent a rapid increase in viscosity and yellowing of a capsule solution upon reaction between gelatin and glyoxal or glutaraldehyde after a hardening pretreatment step, particularly in a hardening treatment step.

As used herein, the term "hardening pretreatment" is intended to cover the operation of rapidly converting the pH of the coacervation system to the alkaline side to promote the reaction between gelatin and an aldehyde. The term "hardening treatment" is intended to cover the operation of raising the temperature of the system to further accelerate the reaction between gelatin and an aldehyde, thus forming a wall film of good heat resistance.

2. Description of the Prior Art

As a process for microencapsulating a hydrophobic oily liquid utilizing complex coacervation wherein one of hydrophilic colloids is gelatin, there is known the process which comprises the five steps of: (1) emulsifying a water-immiscible oil in an aqueous solution of at least one hydrophilic colloid ionizable in water (the first sol), and then admixing an aqueous solution of a hydrophilic colloid (the second sol) having an electric charge opposite to that of the first sol, or emulsifying a water-immisicible oil in an aqueous solution of hydrophillic colloids which are ionizable in water and at least one of which is positively charged [the emulsifying step]; (2) either adding water thereto or adjusting the pH thereof to cause coacervation, thus obtaining coacervates wherein a complex colloid is adhered to the individual oil droplets [the coacervation step]; (3) cooling the coacervates to cause gelation thereof [the gelation step]; (4) adjusting the pH to the alkaline side in the presence of a hardening agent, adding a hardening agent after adjusting the pH to the alkaline side, or adding both a hardening agent and an alkali at the same time [the hardening pretreatment step]; and (5) optionally elevating temperature of the system to harden the gelled coacervate [the hardening step].

However, microcapsules obtained by the above-described process are so unstable that they have the defect in the production thereof that hardening must be effected gradually by allowing them to stand for a long period of time under moderate conditions at a temperature lower than ordinary temperatures. This defect, however, has been somewhat improved by conducting a hardening treatment step subsequent to the aforesaid step (4), wherein oil-containing capsules are rapidly and completely hardened by gradually raising the temperature up to 40°–60°C.

As the agent for hardening the gelatin wall film, in general aldehydes such as formaldehyde, glyoxal, glutaraldehyde, etc., are used. Of these aldehydes, dialdehydes such as glyoxal, glutaraldehyde and the like rapidly harden the wall film and the resulting wall film possesses an excellent heat resistance. However, they have the defect that upon leaving them for a comparatively long period of time at a low temperature after the hardening pretreatment step, the viscosity of the system gradually increases, the capsules produced gradually aggregate, and the capsule solution itself yellows. If the system is not stirred, these defects become more serious. Thus, there are important problems to be solved in that the stability of a microcapsule slurry with the passage of time must be improved.

Also, the conventional process has the defect that upon gradually raising the temperature of the system so as to rapidly and completely harden the oil-containing capsules, the viscosity rapidly rises, the capsules aggregate to form a giant flock, and the capsule solution yellows deeply.

In addition, microcapsules produced by the conventional process have the defect that when used in a pressure sensitive paper, the resolving power of the colored letters in copying using a plurality of sheets is deteriorated because of the large particles. When coating on an original paper by means of an air knife coater, the air pressure of the coater must be raised due to the high viscosity of the coating solution. Thus, an increase in coating speed is hindered.

SUMMARY OF THE INVENTION

One object of the present invention is to overcome the above-described defects and to provide a process whereby microcapsules which do not yellow are produced without an increase in viscosity with the passage of time and without the aggregation of capsules, even when a dialdehyde is used as a hardening agent.

Another object of the present invention is to provide a process whereby microcapsules which do not yellow are produced without a rapid increase in viscosity due to the thermal hardening treatment and without aggregation of capsules in the form of a flock, even when a dialdehyde is used as a hardening agent.

A further object of the present invention is to provide a process for producing microcapsules whereby the coating speed is increased and the drying step is shortened, even when a dialdehyde is used as a hardening agent.

Other objects of the present invention will become apparent from the following descriptions.

It has been found that these and other objects of the invention can be attained by using a dialdehyde and formaldehyde in combination as a hardening agent.

It is surprising that, in spite of the fact that both a dialdehyde having no more than 5 carbon atoms such as glyoxal, glutaraldehyde, etc., and formaldehyde being known as a hardening agent for use in a complex coacervation process wherein at least one of the colloids is gelatin, the above-described objects of the invention can successfully be attained by using both in combination.

DETAILED DESCRIPTION OF THE INVENTION

In practicing the encapsulation of a hydrophobic oily liquid in accordance with the present invention, complex coacervation caused by dilution with water or an adjustment of pH is utilized. That is, the production of a complex coacervate by liquid-liquid phase separation is based on the procedure of separating a mixture comprising at least two hydrophilic colloid sols into two phases; one being a colloid rich phase and the other being a colloid poor phase. At this stage, it is necessary that at least two hydrophilic colloids having opposite electric charges be included as a coacervation colloid, at least one of which can be gelled.

In the process to which this invention is applicable, the first step is an emulsification step in which a water-immiscible oil is emulsified in an aqueous solution of at least one hydrophilic colloid ionizable in water (the first sol) and then admixing an aqueous solution of a hydrophilic colloid (the second sol) having an electric charge opposite to that of the first sol. The temperature of emulsification and droplet formation is not important but must be no less than gelation point of gelatin, preferably about 40°C. The size of the droplets formed in this step is not critical and % by weight of the hydrophilic colloid can be freely selected because the hydrophilic colloid solution is subsequently diluted with water added in the coacervation step to be discussed hereinafter. The time of admixing the first sol and the second sol can also be freely varied. The ratio of the hydrophilic colloids employed can be varied, but it is preferred that the ratio by weight of one hydrophilic colloid (on a solids basis) to the second hydrophilic colloid of opposite charge thereto be about 1.

In the next step, water is either added to the emulsified mixture or the pH is adjusted to cause coacervation. The amount of water to be added is that which will cause coacervation and the amount to be added can be easily selected by one of ordinary skill in the art, for example, based on the disclosure contained in U.S. Pat. No. 2,800,457. Again, the temperature of the system is not limiting but should not be lower than the gelation point of the gelatin. It is, however, preferred that the temperature of the system remain substantially constant until coacervation has been achieved. Where pH adjustment is used, the initial pH of the system and the pH change are not limiting but the final pH of the system must be no greater than the isoelectric point of gelatin, preferably from a pH of 7 to 2, for example, about 4. Suitable pH adjusting agents can be organic acids (e.g., succinic acid, acetic acid, etc.) and mineral acids (e.g., hydrochloric acid, etc.).

In step 3, the coacervates are cooled to cause gellation. The temperature at the beginning of the cooling step is substantially the same as that used in the coacervation step. The temperature at the completion of the cooling step should be no greater than the gelation point of the gelatin and generally is no lower than the freezing point of water (e.g., about 5°C), usually at about 10°C.

The rate of cooling is not important and will depend on the volume to be cooled. Rapid cooling can be utilized in accomplishing the gelation step.

Once the coacervates have gelled, the pH of the system is adjusted to the alkaline side. A preferred pH after adjustment is a pH of from about 7.5 to about 12. Usually the final pH will be about 10. The temperature during pH adjustment to the alkaline side is not critical but the temperature should be no greater than the gelation point of the gelatin. The pH can be rendered alkaline utilizing agents such as NaOH, KOH and the like.

The above steps can be followed where desired by an optional hardening step in which the temperature of the coacervate is raised to harden the coacervate.

All of the steps set forth above are generally well known to one of ordinary sill in the art as disclosed, for example, in U.S. Pat. No. 2,800,457.

As the hydrophilic colloids, there are included natural or synthetic ones such as amino acid containing compounds, for example, gelatin, casein, alginate, and the like, saccharides, such as gum arabic, carrageenan, copolymers such as styrenemaleic anhydride copolymers, methyl vinyl ether-maleic anhydride copolymers, and the like, cellulose, compounds, such as carboxymethyl cellulose, cellulose sulfate and the like soluble, starches such as sulfated starch, etc.

As the hydrophobic materials for the nucleus of the individual microcapsules, there are illustrated natural mineral oils, animal oils, vegetable oils, synthetic oils, and the like. Examples of the mineral oils include petroleum and petroleum fractions such as kerosene, gasoline, naphtha, and paraffin oil. Examples of the animal oils include fish oils, lard oil and the like. Examples of the vegetable oils include peanut oil, linseed oil, soybean oil, castor oil, corn oil and the like. Examples of the synthetic oils include biphenyl derivatives such as alkylated biphenyls (e.g., methyl, ethyl, or isopropyl-substituted biphenyls), phosphate esters, naphthalene derivatives, phthalic acid derivatives, salicylic acid derivatives and the like.

In order to emulsify and disperse a hydrophobic liquid which is to be the nuclear material in water, an anionic, cationic or non-ionic surface active agent is preferably used to prevent phase reversal (i.e., formation of a w/o emulsion). Turkey red oil or sodium alkyl benzene sulfonates can be utilized. An oil-in-water emulsion can be obtained by emulsifying a hydrophobic oily liquid which is converted to the nuclear material in at least one hydrophilic colloid aqueous solution, the colloid becoming a wall material. The resulting emulsion is then subjected to water dilution and adjustment of pH to thereby deposit the coacervate around the emulsified individual oil droplets. The coacervate deposited on the surface of the oil droplets is cooled from outside the vessel to gel the wall film. Then, in order to harden the wall film, a dialdehyde, e.g., glutaraldehyde, is added to the system followed by adjusting the pH of the system to the alkali side, or else the pH of the system is adjusted to the alkali side followed by adding a dialdehyde, e.g., glutaraldehyde, thereto. The stage of adding formaldehyde is not particularly limited and may be before, during or after the above-described hardening procedure. The same effects of the combined use of the formaldehyed with a dialdehyde are obtained in any case.

In order to provide the capsule wall film with heat resistance, the system is left for a long period of time for example, a day, at a low temperature for example, room temperature, or, if short time processing is required, heated to 40° to 60°C.

The amount of formaldehyde to be added together with a dialdehyde used as a hardening agent is that necessary to improve the stability with the passage of time after the hardening pretreatment step, and varies depending upon the amount of a dialdehyde used. That is, as the amount of a dialdehyde used increases, the minimum necessary amount of formaldehyde decreases while, on the other hand, when the amount of a dialdehyde exceeds a certain amount, the minimum necessary amount of formaldehyde becomes constant.

For example, when about 0.6 part of glyoxal is used per 100 parts of gelatin, the minimum necessary amount of formaldehyde to be added is about 0.6 part. When about 1.3 parts of glyoxal is used, the minimum necessary amount of formaldehyde to be added becomes about 0.3 part. When about 2.5 parts of glyoxal is used, the minimum necessary amount of formaldehyde to be added becomes about 0.16 part. When the amount of glyoxal is further increased to about 5 parts, the minimum necessary amount of formaldehyde is reduced to about 0.05 part. When the amount of glyoxal used is increased even more, the minimum necessary amount of formaldehyde is not reduced but remains about 0.05 part.

When the amount of glutaraldehyde to be used as a hardening agent is less than about 0.05 part per 1 part of gelatin, there occurs the phenomena of an increase in viscosity and coloring of the capsule solution to a skin-like color.

The amount of formaldehyde added so as to remove the above-described defects varies depending upon the amount of glutaraldehyde used. That is, when less than about 5 parts, based on 100 parts of gelatin, of glutaraldehyde is used, it is preferred that at least about 0.7 parts of formaldehyde is added. On the other hand, when not less than about 5 parts, based on 100 parts of gelatin, of glutaraldehyde is used, it is preferred that the amount of formaldehyde added is at least about 0.05 parts, and is preferably not less than 0.05 parts, though not particularly limited.

In summary, when the dialdehyde is glyoxal, the minimum necessary amount of formaldehyde is preferably at least about 0.05 part based on 100 parts of gelatin. When less-than about 5 parts, based on 100 parts of gelatin, of glutaraldehyde is used as the dialdehyde, it is preferred that at least about 0.7 parts of formaldehyde be added. When about 5 parts or more, based on 100 parts of gelatin, of glutaraldehyde are used, it is preferred that the amount of formaldehyde-added be at least about 0.05 parts.

The effects of the combined use and addition of formaldehyde in the invention are described below, first for glyoxal and then for a glutaraldehyde.

GLYOXAL

100 Parts of gelatin and 75 parts of gum arabic were used, and the volume was made 5000 parts by the addition of water. The pH was adjusted to 4.5, thus causing complex coacervation. After cooling, 12.5 parts of a 40% aqueous solution of glyoxal was added thereto, followed by adding an alkali dropwise to adjust the pH to 10. The viscosity of the resulting liquid at this time is 82 cp but, after stirring the liquid for one day and one night at a low temperature, the viscosity of the liquid became 194 cp, the liquid yellowed and aggregation occurred. Without stirring, the viscosity of the liquid increased to 727 cp.

Further, when the temperature of the liquid was raised up to 50°C instead of stirring the liquid for 1 day and 1 night in order to harden the capsule wall films in a short time, the viscosity increased to 235 cp and the liquid yellowed.

On the other hand, when 0.2 part of a 37% formaldehyde aqueous solution was added to 12.5 parts of the 40% glyoxal aqueous solution according to the present invention, the viscosity at pH 10 after adding alkali dropwise thereto became 74 cp. Upon stirring the liquid for 1 day and 1 night, the viscosity of the liquid lowered to 38 cp and yellowing of the liquid and aggregation of the microcapsules did not take place. Further, when the temperature of the liquid was raised to 50°C to conduct the thermal hardening treatment, the viscosity of the liquid greatly reduced to 13 cp. Similar effects can be obtained by using glutaraldehyde in place of glyoxal, as shown below.

GLUTARALDEHYDE

100 Parts of gelatin and 75 parts of gum arabic were used, and the volume was made 5000 parts by adding water, the pH being adjusted to 4.5 to cause complex coacervation. After cooling, 7.2 parts of a 25% aqueous solution of glutaraldehyde was added thereto, followed by dropwise adding alkali thereto to adjust the pH to 10.7. The viscosity of the resulting liquid at this time was 158 cp but, after stirring the liquid for 1 day and 1 night at low temperature, the viscosity of the liquid became 243 cp, the liquid yellowed and aggregation of the microcapsules occurred. Without stirring, the viscosity of the liquid increased significantly to 649 cp. Further, when the temperature of the liquid was raised to 50°C instead of stirring the liquid for 1 day and 1 night in order to harden the capsule wall film in a short time, the viscosity increased to 394 cp and the liquid was tinged with a skin-like color.

On the other hand, when 3.6 parts of a 37% aqueous formaldehyde solution was added to the 7.2 parts of the 25% aqueous glutaraldehyde solution according to the present invention, the viscosity at pH 10.7 after dropwise adding thereto alkali became 95 cp. Upon stirring the liquid for 1 day and 1 night, the viscosity of the liquid lowered to 39 cp and yellowing of the liquid and aggregation of the microcapsules did not take place. Also, when the temperature of the liquid was raised to 50°C to conduct thermal hardening, the viscosity of the liquid lowered to 12 cp.

As is described above, there can be obtained microcapsules of excellent stability with the passage of time after the hardening pretreatment step by using formaldehyde and a dialdehyde in combination.

An encapsulation process utilizing coacervation has the defect that the hardening pretreatment step takes a long time. It is beneficial to use the procedure of British Pat. No. 1,253,113 in a coacervation, which improves the above defect and the present invention because it becomes possible to convert the pH to the alkaline side in a short time in a hardening pretreatment by adding "a shock-preventing agent" in the presence of the hardening aldehydes.

The term "shock" as used herein means the phenomenon in which, in carrying out the hardening pretreatment of a coacervation capsule solution containing gelatin as described in the aforesaid British Patent specification, the viscosity is rapidly increased when the pH of the system is around the isoelectric point of gelatin. The term "shock-preventing agent" means a solution which prevents such shock. Shock-preventing agents which may be used in this invention are polyelectrolytes having an anionic functional group. As examples of such polyelectrolytes may be mentioned modified cellulose, an anionic starch derivative, an anionic acid polysaccharide, a condensate of naphthalene sulfonic acid and Formalin, a hydroxyethyl cellulose derivative, a copolymer of vinylbenzene sulfonate and a copolymer of sodium acrylate.

As examples of modified cellulose, there may be mentioned polysaccharides having β-1,4-glucoside bonds of glucose and having anionic functional groups. Part or all of the hydroxyl groups of the cellulose may be etherified or esterified. Illustrative of cellulose ethers are carboxymethyl cellulose, carboxyethyl cellulose and metal salts thereof, and illustrative of cellulose esters are cellulose sulfate, cellulose phosphate and metal salts thereof.

The anionic starch derivative may be one which is composed of a linear polysaccharide amylose formed by only α-1,4 bonds of D-glucose, and a branched polysaccharide amylopectin formed by mainly α-1,4 bonds of D-glucose and partially side chain branched by α-1,6 bonds.

As examples of the above starch derivatives may be mentioned carboxymethyl starch, carboxyethyl starch, starch sulfate, starch phosphate and starch xanthate. These are obtained by etherification or esterification of corn starch, wheat starch, rice starch, potato starch, sweet potato starch or tapioca starch, which may be extracted from either the seeds of the roots of the plants in high yield.

As examples of the anionic acid polysaccharides, there may be mentioned polygalacturonic acid, which is obtained by polycondensating linearly D-galacturonic acid between α-1,4 bonds thereof. The acid polysaccharide contains pectin, pectic acid and pectinic acid. These are basic substances comprising pectin matter in a high plane and have been defined as follows: pectinic acid-polygalacturonic acid in the colloid form containing some methyl ester groups; pectin-water soluble pectinic acid containing methyl ester groups; pectic acid-polygalacturonic acid in the colloid form containing no methyl ester groups.

The separation of these compounds may be conducted, in general, by extraction from acids.

The condensate of naphthalene sulfonic acid and Formalin is represented by the following formula:

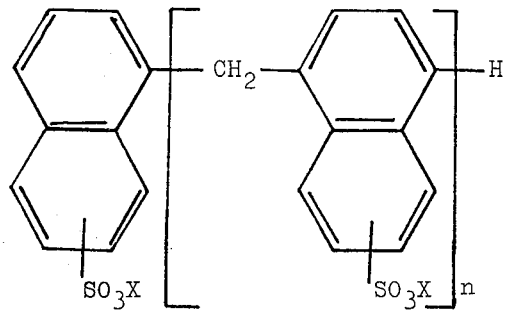

wherein X is a hydrogen atom, an alkali metal or an ammonium group, and $n$ is a positive integer.

Shock-preventing ability of the above condensate is influenced by the degree of polymerization, and it is preferable that $n$ be 5 to 9. In general, the larger the value of $n$, the more water-solubility and viscosity increases. These compounds are described in Kogyo Kagaku Zashi 66 [1], pp. 55–69 (1963).

As examples of the hydroxyethyl celulose derivatives, there may be mentioned carboxymethyl ether of hydroxyethyl cellulose, hydroxyethyl cellulose sulfate and hydroxyethyl cellulose phosphate and the like.

As examples of the copolymers of vinylbenzene sulfonate, there may be mentioned vinylbenzene sulfonate-acryloylmorpholine copolymer, vinylbenzene sulfonate-morpholinomethylacrylamide copolymer, vinylbenzene sulfonate acrylamide copolymer, vinylbenzene sulfonate-vinylpyrrolidone copolymer, and vinylbenzene sulfonate-methoxymethylacrylamide.

These polymers contain the following group in the molecule:

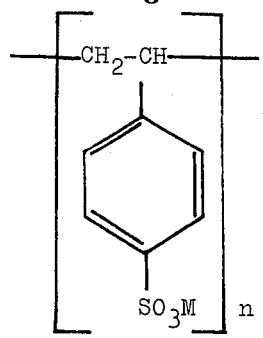

wherein M is an alkali metal and $n$ is a positive integer. The amount of vinylbenzene sulfonate in the copolymer is preferably 45–95 mol percent, more preferably 60–85 mol percent, and it is preferred, for the purpose of this invention, to use a copolymer having a molecular weight of 10,000–3,000,000, particularly 100,000–1,000,000.

As examples of copolymers of acrylic acid, there may be mentioned acrylic acid-acryloylmorpholine copolymer, acrylic acid-morpholinomethylacrylamide, acrylic acid-acrylamide copolymer, acrylic acid-vinylpyrrolidone copolymer, and acrylic acid-methoxymethylacrylamide.

These polymers contain the following group:

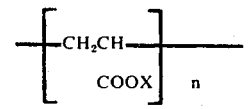

wherein X is a hydrogen atom or an alkali metal, and $n$ is a positive integer.

The amount of acrylic acid in the copolymer is preferably in 40–95 mol percent, especially 50–85 mol percent, and it is preferable, for the purposes of this invention, to use a copolymer having molecular weight of 6,000–2,000,000, especially 50,000–1,000,000.

The amount of the polyelectrolyte is from 1/12 to ½ by weight based on the total amount of hydrophilic colloids present.

As has been stated above, the process of the present invention is extremely useful for the production of microcapsules.

The present invention will now be described more specifically by reference to the following examples. However, the present invention is not to be interpreted as limited by these examples in any way.

In the present invention, the heat resistance of microcapsules was determined by dissolving 2% by weight, based on the oil, of crystal violet lactone in oil droplets, applying the resulting microcapsules to an original paper, conducting a heat resistance test in a hot air drying box, and superposing the capsule-coated surface on a clay-coated paper to examine whether the clay-coated paper colored or not.

The clay-coated paper was prepared as follows.

100 Parts of sulfuric acid-processed acidic terra abla was dispersed in 300 parts of water containing 6 parts of a 40% sodium hydroxide aqueous solution and, after dispersing by means of a homogenizer, 40 parts of Dow Latex 636 (trade name of styrene butadiene latex, made by Dow Chemical Co. having a solid content of 48% by weight, a specific gravity of the latex of 1.003 (25°C), a specific gravity of the solid of 1.008, a latex viscosity of 40 cp. (using a BROOK FIELD Viscosimeter, 50 R.P.M.) was added thereto. The resulting dispersion was applied to a 50 g/m² original paper in a thickness of 12 g/m² as solids by means of a coating rod and dried. The thus coated paper was used as the clay-coated paper.

In the following examples, "parts" and "%'s" are by weight.

EXAMPLE 1

6 Parts of acid-processed gelatin having an isoelectric point of 7.8 and 6 parts of gum arabic was dissolved in 40°C water, and 0.5 parts of Turkey red oil was added as an emulsifier. Then, 30 parts of diisopropylbiphenyl containing dissolved therein 2% of crystal violet lactone (CVL) was added to the colloidal solution under vigorous stirring for emulsification to form an o/w emulsion. The stirring was discontinued when the size of oil droplets became 6 to 10 microns. All of the above operations were conducted at 40°C. 250 Parts of warm water at 45°C was added thereto.

Thereafter, 50% acetic acid was added dropwise thereto, while continuing the stirring, to adjust the pH to 4.5. After maintaining the system at 45°C for 15 minutes under stirring, the system was cooled from outside the vessel from 45°C to 15°C for gelling and to solidify the colloidal wall deposited around the oil droplets, the stirring being continued and when the liquid temperature reached 15°C, 1.0 part of a 40% aqueous glyoxal solution and 0.2 parts of a 37% aqueous formaldehyde solution were added thereto at the same time. Stirring and cooling were continued, and when the liquid temperature reached 10°C, the addition of a 10% aqueous sodium hydroxide solution was started and the pH of the liquid was adjusted to 10. After allowing the system to stand for 30 minutes at 10°C the temperature of the liquid was raised to 50°C over 20 minutes to obtain highly heat-resistant, non-yellowed microcapsules containing diisopropylbiphenyl having CVL dissolved therein. The viscosity of the resulting capsule solution was 65 cp at pH 10 at 10°C and 15 cp after raising the temperature to 50°C.

Where formaldehyde was not added, the viscosity was 77 cp at pH 10 and 10°C, but the viscosity became 351 cp after raising the temperature to 50°C. Furthermore, the capsule solution yellowed and the microcapsules aggregated in the form of a giant flock.

EXAMPLE 2

1 Part of CVL and 0.7 parts of benzoyl leucomethylene blue were dissolved in 40 parts of diisopropylbiphenyl and 10 parts of chlorinated normal paraffin (chlorinated 20% by weight and having 14 carbon atoms). This oily liquid was added to an aqueous solution comprising 7 parts of gum arabic and 60 parts of warm water at 40°C to prepare an oil-in-water emulsion containing oil droplets of 6–10 microns in size. Thereafter, an aqueous solution prepared by dissolving 10 parts of an acid-processed gelatin having an isoelectric point of 8.1 in 80 parts of warm water at 40°C was added to the above-described emulsion, and 50% acetic acid was added thereto under constant stirring to adjust the pH to 4.3. Subsequently, 250 parts of warm water at 40°C was added thereto to cause coacervation, all of these operation being at 40°C.

The system was then cooled from outside the vessel, while continuing the stirring, to solidify the colloid deposited around the oil droplets. When the liquid temperature reached 10°C, 0.7 parts of a 40% aqueous glyoxal solution was added thereto. At this time, 40 parts of a 10% aqueous solution of carboxymethyl cellulose sodium salt (hereinafter referred to as a CMC solution; etherification degree: 0.75; viscosity in 2% aqueous solution at 25°C: 16 cp) was added thereto and, in order to enhance the hardening effect, a 10% aqueous sodium hydroxide solution was added dropwise thereto to adjust the pH to 10. Then, 0.8 parts of a 37% aqueous formaldehyde solution was added thereto and the liquid temperature raised from 10°C to 50°C. At this time, the viscosity of the liquid was 14 cp. The form of the resulting capsules was normal. Yellowing of the capsule solution was not observed.

The resulting capsule solution was applied to an original paper and subjected to a heat resistance test in a 150°C drying box for 3 hours. When this capsule-coated paper was superposed on a clay-coated paper and pressed with a ballpoint pen, there was obtained a distinct colored mark on the clay-coated paper.

Where formaldehyde was not added after adjusting the pH to 10 in this example, there were produced unfavorable results in that the viscosity sharply increased to 164 cp after raising the liquid temperature to 50°C and the capsule solution yellowed.

EXAMPLE 3

A hydrophobic oily liquid prepared by dissolving 1 part of CVL in 40 parts of phenylcyclohexane was dissolved in an aqueous solution comprising 10 parts of gum arabic and 60 parts of warm water to prepare an oil-in-water emulsion containing oil droplets of 8–11 microns in size. Thereafter, an aqueous solution prepared by dissolving 10 parts of acid-processed gelatin having an isoelectric point of 8.0 in 80 parts of warm water at 40°C was added thereto, and 50% acetic acid was added under constant stirring to adjust the pH to 4.5 at 40°C. Subsequently, 250 parts of warm water at 40°C was added thereto to cause coacervation. The system was cooled from outside the vessel from 40°C to 10°C while continuing the stirring to solidify the colloid deposited around the oil droplets, and when the liquid temperature reached 10°C, 40 parts of a 10% CMC solution was added and a 10% aqueous sodium hydroxide solution was added thereto to adjust the pH to 11. Thereafter, a mixed solution comprising 0.15 parts of a 40% aqueous glyoxal solution and 0.2 parts of a 37% aqueous formaldehyde solution was added dropwise thereto at 10°C. The viscosity after the completion of the dropwise addition was 57 cp. In order to complete the hardening of the capsule wall film to obtain microcapsules of excellent heat resistance, the stirring was continued for 2 days while allowing the liquid temperature to naturally rise to 25°C. The thus formed microcapsules were of a normal form, no coloring occurred, and the viscosity of the liquid was as low as 23 cp.

Where glyoxal was added dropwise without using formaldehyde in combination therewith in this example, the viscosity of the capsule solution after the completion of the dropwise addition thereof was 107 cp, and the viscosity after stirring for two days rose to 312 cp. The size of the resulting microcapsules was not uniform, the size of the larger ones reaching as large as 2–3 mm. In addition, the capsule solution yellowed.

EXAMPLE 4

A hydrophobic oily liquid prepared by dissolving 1 part of CVL in 30 parts of diisopropylnaphthalene was emulsified in a colloid solution comprising 0.5 parts of methyl cellulose, 4 parts of gum arabic and 25 parts of warm water to prepare an o/w emulsion. The stirring was discontinued when the size of the largest oil droplets became 10 microns. This emulsion was added to a aqueous gelatin solution comprising 6 parts of acid-processed gelatin having an isoelectric point of 7.9 and 170 parts of warm water at 45°C. A 5.0% aqueous succinic acid solution was added thereto under stirring to adjust the pH to 4.2. The coacervate wall film was gelled and solidified by cooling the vessel from the outside from 45°C to 10°C while continuing mild stirring. When the liquid temperature reached 10°C, 3.0 parts of a 40% glyoxal aqueous solution and 0.2 parts of a 37% formaldehyde aqueous solution were added at the same time, followed by adding 30 parts of a 5 % aqueous CMC solution. Then, a 10% aqueous sodium hydroxide solution was added thereto to adjust the pH to 10.5, all of these operation being at about 10°C. At this time, the viscosity of the liquid was 67 cp. The temperature of the capsule solution was raised up to 50°C to obtain non-yellowed, hardened microcapsules. The viscosity at this time was 20 cp.

Where formaldehyde was not added in this example, the viscosity of the liquid was 81 cp at pH 10.5 and, after raising the liquid temperature to 50°C, the viscosity became 347 cp, the capsule solution deeply yellowed, and the microcapsules aggregated in the form of a giant flock.

EXAMPLE 5

6 Parts of acid-processed gelatin having an isoelectric point of 7.8 and 6 parts of gum arabic were dissolved in 35 parts of warm water at 40°C. To this solution was added 0.3 parts of sodium alkylbenzene sulfonate as an emulsifier. Then, 35 parts of xylylphenylethane containing dissolved therein 2% CVL was emulsified therein to prepare an o/w emulsion. The size of the oil droplets produced was 8–12 microns. This emulsion was then poured into 200 parts of an aqueous solution at 45°C containing 0.08% of sodium sulfate, and a 50% acetic acid aqueous solution was added dropwise thereto under stirring to adjust the pH to 4.3. Subsequently, 0.2 parts of a 40% aqueous glyoxal solution and 0.9 parts of a 37% aqueous formaldehyde solution were simultaneously added thereto, followed by cooling from outside the vessel to adjust the liquid temperature from about 45°C to 8°C. Thereafter, 25 parts of a 7% aqueous CMC solution was added thereto and a 10% aqueous sodium hydroxide solution was added dropwise thereto to adjust the pH to 9.5. The viscosity at this time was 59 cp. The liquid temperature was then raised from about 8°C to 50°C. At this time, the viscosity was 14 cp, the capsule solution did not yellow at all, and no abnormalities were observed in the form of the microcapsules.

Where formaldehyde was not added, the viscosity of the liquid was 104 cp at pH 9.5 and, after raising the liquid temperature to 50°C, the viscosity rose substantially to 772 cp, the capsule solution yellowed, and microcapsules aggregating in a form of a giant flock were produced.

EXAMPLE 6

6 Parts of acid-processed gelatin having an isoelectric point of 7.8 and 6 parts of gum arabic were dissolved in a 40°C water, and 0.5 parts of Turkey red oil was added as an emulsifier. Then, 30 parts of diisopropylbiphenyl containing dissolved therein 2% of crystal violet lactone (CVL) was added to the collidal solution with vigorous stirring for emulsification to form an o/w emulsion. The stirring was discontinued when the size of oil droplets became 6 to 10 microns. 250 Parts of warm water at 45°C was added thereto. Thereafter, 50% acetic acid was added dropwise thereto, while continuing the stirring, to adjust the pH to 4.5. After maintaining the system at 45°C for 15 minutes under stirring, the system was cooled from outside of the vessel from 45°C to 15°C to gel and solidify the colloidal wall deposited around the oil droplets, the stirring being continued and, when the liquid temperature reached 15°C, 0.8 parts of a 25% aqueous glutaraldehyde solution and 0.2 parts of a 37% aqueous formaldehyde solution were added thereto at the same time. When the liquid temperature reached 10°C, the addition of a 10% aqueous sodium hydroxide solution was started and the pH of the liquid adjusted to 10. After allowing the system to stand for 30 minutes at 10°C, the temperature of the liquid was raised to 50°C over 20 minutes to obtain highly heat-resistant, non-skin-colored microcapsules containing diisopropylbiphenyl having dissolved therein CVL. The viscosity of the resulting capsule solution was 48 cp at pH 10 and 10°C and 15 cp after raising the temperature to 50°C.

Where formaldehyde was not added, the viscosity was 147 cp at pH 10, and 10°C, but it became 322 cp after raising the temperature to 50°C. Furthermore, there were produced skin-colored microcapsules aggregating in the form of flock.

EXAMPLE 7

1 Part of CVL and 0.7 parts of benzoyl leucomethylene blue were dissolved in 40 parts of diisopropylbiphenyl and 10 parts of chlorinated normal paraffin (chlorinated to 20% by weight and having 14 carbon atoms). This oily liquid was added to an aqueous solution comprising 7 parts of gum arabic and 60 parts of warm water at 40°C to prepare an oil-in-water emulsion containing oil droplets of 6–10 microns in size. Thereafter, an aqueous solution prepared by dissolving 10 parts of an acid-processed gelatin having an isoelectric point of 8.1 in 80 parts of warm water at 40°C was added to the above-described emulsion, and 50% acetic acid was added thereto under constant stirring to adjust the pH to 4.3. Subsequently, 250 parts of warm water at 40°C was added thereto to cause coacervation. The system was cooled from outside the vessel from 40°C to 10°C while continuing stirring to solidify the colloid deposited around the oil droplets, and when the liquid temperature reached 10°C, 7.2 parts of a 25% aqueous glutaraldehyde solution was added thereto. At this time, 40 parts of a 10% aqueous solution of CMC solution as used in Example 2 was added thereto and, subsequently, a 10% aqueous sodium hydroxide solution was added and, when the pH reached 8, 4.5 parts of a 37% aqueous formaldehyde solution was added thereto. Thereafter, a 10% aqueous solution of sodium hydroxide was added dropwise thereto to adjust the pH to 10. The liquid temperature was then raised from 10°C to 50°C. At this time, the viscosity of the liquid was 14 cp. The form of the resulting capsules was normal and coloring of the capsule solution to a skin-like color was not observed.

The resulting capsule solution was applied to an original paper and subjected to a heat resistance test in a 150°C drying box for 3 hours. When this capsule-coated paper was superposed on a clay-coated paper and pressed with a ballpoint pen, there was obtained a distinct colored mark on the clay-coated paper.

When the 4.5 parts of the 37% aqueous formaldehyde solution was not added at pH 8 in this example, there were obtained unfavorable results that the viscosity sharply increased to 597 cp after raising the liquid temperature to 50°C and the capsule solution was tinged with a skin-like color.

EXAMPLE 8

A hydrophobic oily liquid prepared by dissolving 1 part of CVL in 40 parts of phenylcyclohexane was dissolved in an aqueous solution comprising 10 parts of gum arabic and 60 parts of warm water to prepare an oil-in-water emulsion containing oil droplets of 8–11 microns in size. Thereafter, an aqueous solution prepared by dissolving 10 parts of acid-processed gelatin having an isoelectric point of 8.0 in 80 parts of warm water at 40°C was added thereto, and 50% acetic acid was added under constant stirring to adjust the pH to 4.5. Subsequently, 250 parts of warm water at 40°C was added thereto to cause coacervation. The system was cooled from outside the vessel, from 40°C to 10°C while continuing the stirring to solidify the colloid deposited around the oil droplets, and when the liquid temperature became 10°C, 40 parts of a 10% CMC solution was added and a 10% aqueous sodium hydroxide solution was added to adjust the pH to 11. Thereafter, at 10°C a mixed solution comprising 0.4 parts of a 25% aqueous glutaraldehyde solution and 0.6 parts of a 37% aqueous formaldehyde solution was added dropwise thereto. The viscosity after the completion of the dropwise addition was 87 cp. In order to complete the hardening of the capsule wall film to obtain microcapsules of excellent heat resistance, the stirring was continued for 2 days while allowing the liquid temperature to naturally rise to 25°C. The thus formed microcapsules were of normal form, no coloring occurred, and the viscosity was as low as 22 cp.

Where the 0.4 parts of the aqueous glutaraldehyde solution was independently added dropwise without using the 0.6 parts of the 37% aqueous formaldehyde solution in combination therewith, the viscosity of the capsule solution after the completion of the dropwise addition thereof was 157 cp, and the viscosity after stirring for 2 days sharply rose to 664 cp. The size of the resulting microcapsules was not uniform, the size of the large microcapsules reaching as large as 2–3 mm. In addition, the capsule solution yellowed.

EXAMPLE 9

A hydrophobic oily liquid prepared by dissolving 1 part of CVL in 30 parts of diisopropylnaphthalene was emulsified in a colloid solution comprising 0.5 parts of methyl cellulose, 4 parts of gum arabic and 25 parts of warm water to prepare an o/w emulsion. The stirring was discontinued when the size of the largest oil droplets reached 10 microns. This emulsion was added to an aqueous gelatin solution comprising 6 parts of acid-processed gelatin having an isoelectric point of 7.9 and 170 parts of warm water at 45°C. A 5.0% aqueous succinic acid solution was added thereto while stirring to adjust the pH to 4.2. The coacervate wall film was then gelled and solidified by cooling from outside the vessel from 45°C to 10°C while continuing mild stirring, and when the liquid temperature reached 10°C, 2.6 parts of a 25% aqueous glutaraldehyde solution and 0.2 parts of a 37% aqueous formaldehyde solution were added at the same time, followed by adding 30 parts of a 5% CMC aqueous solution. Then, a 10% aqueous sodium hydroxide solution was added thereto to adjust the pH to 10.5. The temperature of the capsule solution was then raised from 10°C to 50°C to obtain non-skin-colored, hardened microcapsules.

When the 0.2 parts of the 37% aqueous formaldehyde solution was not used in this example, the liquid was deeply tinged a skin-color in the thermal hardening step.

EXAMPLE 10

6 Parts of acid-processed gelatin having an isoelectric point of 7.8 and 6 parts of gum arabic were dissolved in 35 parts of warm water at 40°C. To this solution was added 0.3 part of sodium alkylbenzene sulfonate as an emulsifier. Then, 35 parts of xylylphenylethane containing dissolved therein 2% of CVL was emulsified therein to prepare an o/w emulsion. The size of the oil droplets produced was 8–12 microns. This emulsion was then poured into 200 parts of a 45°C aqueous solution containing 0.08% of sodium sulfate, and a 50% aqueous acetic acid solution was dropwise added thereto while stirring to adjust the pH to 4.3. Subsequently, 0.68 parts of a 25% aqueous glutaraldehyde solution and 0.22 parts of a 37% aqueous formaldehyde solution were simultaneously added thereto, followed by cooling from outside the vessel from 45°C to a liquid temperature of 8°C. Thereafter, 25 parts of a 7% aqueous CMC solution was added thereto and a 10% aqueous sodium hydroxide solution was added dropwise thereto to adjust the pH to 9.5. The viscosity at this time was 68 cp. The liquid temperature was then raised from 8°C to 50°C. At this time, the viscosity was 13 cp, the capsule solution was not tinged a skin-like color, and no abnormality was observed as to the form of microcapsules.

When the 0.22 parts of the 37% aqueous formaldehyde solution was not used the viscosity of the liquid was 117 cp at pH 9.5 and 8°C and, after raising the temperature to 50°C, the viscosity sharply rose to 542 cp, the capsule solution was tinged a skin-like color, and there were produced microcapsules aggregating in the form of a giant flock.

EXAMPLE 11

An oily liquid prepared by dissolving 2 parts of CVL in 30 parts of diisopropylnaphthalene was emulsified in a colloid sol comprising 4 parts of gum arabic and 25 parts of warm water to prepare an o/w emulsion. The stirring was discontinued when the size of the largest oil droplets became 8 microns. The resulting emulsion was added to an aqueous gelatin solution comprising 6 parts of acid-processes gelatin having an isoelectric point of 7.8 and 170 parts of warm water at 45°C. Thereafter, a 50% aqueous acetic acid solution was added thereto while stirring to adjust the pH to 4.5. The coacervate wall film was gelled and solidified by cooling from 45°C to 10°C from outside the vessel under mild stirring, and when the liquid temperature reached 10°C, 1.4 parts of a 25% aqueous glutaraldehyde solution was added thereto and, subsequently, 30 parts of a 5% CMC aqueous solution was added thereto. A 10% aqueous sodium hydroxide solution was added dropwise thereto to adjust the pH of the liquid to 10 and, further, 0.05 parts of a 37% aqueous formaldehyde solution was added thereto. Thereafter, the temperature of the capsule solution was raised from 10°C to 50°C to obtain non-skin-colored, hardened microcapsules.

When the 0.05 parts of the 37% aqueous formaldehyde solution was not used the liquid was deeply tinged a skin-like color in the thermal hardening step.

While the invention has been described in detail and with reference to specific embodiments thereof, it will be apparent to one skilled in the art that various changes and modifications can be made therein without departing from the spirit and scope thereof.

What is claimed is:

1. In a process for hardening microcapsules produced by microencapsulating hydrophobic oil droplets using a complex coacervation process with gelatin as one of the hydrophilic colloids wherein the process includes the steps of
   1. emulsifying a water-immiscible oil in an aqueous solution of at least one first hydrophilic colloid ionizable in water and admixing an aqueous solution of at least one second hydrophilic colloid having an electric charge opposite to that of said first colloid,
   2. causing coacervation of said colloids to occur by adding water thereto or adjusting the pH thereof to form coacervates,
   3. cooling said coacervates to cause gelling thereof,
   4. adjusting the pH to alkalinity and adding a hardening agent sequentially or simultaneously,
   5. increasing the temperature so as to cause hardening, the improvement wherein glyoxal or glutaraldehyde together with formaldehyde is present during step (4), the amounts employed being (a) with glyoxal, as the amount of glyoxal increases the minimum amount of formaldehyde decreases, such that when the amount of glyoxal per 100 parts of gelatin is 0.6 parts the minimum amount of formaldehyde per 100 parts of gelatin is 0.6 parts, the minimum amount of formaldehyde per 100 parts of gelatin being at least 0.05 parts, and (b) with glutaraldehyde, when the amount of glutaraldehyde per 100 parts of gelatin is less than 5 parts the minimum amount of formaldehyde is at least 0.7 parts, and when 5 or more parts of glutaraldehyde are employed the amount of formaldehyde is not less than 0.05 parts, said parts being by weight.

2. The process of claim 1, wherein a surface active agent is additionally present during said emulsifying step; and wherein a shock-preventing agent in the form of a polyelectrolyte having an anionic functional group is present during said pH adjustment to alkalinity step, said shock-preventing agent being selected from the group consisting of modified cellulose, an anionic starch derivative, an anionic acid polysaccharide, a condensate of naphthalene sulfonic acid and Formalin, a hydroxyethyl cellulose derivative, a copolymer of vinylbenzene sulfonate, and a copolymer of sodium acrylate.

3. The process of claim 1, wherein said hydrophobic oil is a mineral oil, an animal oil, a vegetable oil or a synthetic oil.

4. The process of claim 1, wherein said hydrophilic colloids are amino acid-containing compounds, saccharide compounds, synthetic copolymers, cellulose compounds, or soluble starches.

5. The process of claim 4, wherein said colloids are gelatin, casein, alginate, gum arabic, carrageenan, styrene-maleic anhydride copolymer, methyl vinyl ether-maleic anhydride copolymer, carboxy methyl cellulose, cellulose sulfate or sulfated starch.

6. The process of claim 1, wherein one of said hydrophilic colloids is gelatin and the second of said hydrophilic collids is gum arabic or carboxy methyl cellulose.

* * * * *